Patented Apr. 3, 1934

1,953,231

UNITED STATES PATENT OFFICE 1,953,231

PRODUCTION OF MONOCARBOXYLIC ACIDS AND THEIR DERIVATIVES

Alphons O. Jaeger, Crafton, Pa., assignor to The Selden Company, Pittsburgh, Pa., a corporation of Delaware No Drawing. Application April 6, 1929
Serial No. 353,271

2 Claims. (Cl. 260—109)

This invention relates to the production of mono-carboxylic acids and particularly substituted benzoic acids from substituted phthalic acids.

I have found that it is possible to prepare substituted benzoic acids by heating the corresponding substituted phthalic acids and especially their salts in water, preferably under pressure, with or without the presence of splitting catalysts. Surprising as it may seem, even when the process is carried out in the presence of alkali, as when salts of phthalic acid are heated, the substituent remains and the corresponding substituted benzoic acid is obtained.

Among the substituted phthalic acids or their corresponding salts which may be transformed into the corresponding benzoic acids by the present invention are halogen substituted phthalic acids, such as mono- or polychlorphthalic acids, or mono- or polybromphthalic acids; the mono- and polynitrophthalic acids, both 3 and 4 nitro; halogennitrophthalic acids; and the like. Hydrogenated phthalic acid, such as di-, tetra- and hexa-hydrophthalic acids may also be split to the corresponding benzoic acids by the process of this invention.

When the free acid is heated in an autoclave, for example at temperatures from 300–400° C. and particularly temperatures in the neighborhood of 350° C., high yields of substituted benzoic acid are obtained under suitable circumstances. I have found that it is desirable not to use an iron autoclave as there is serious attack and the yield is decreased. Copper autoclaves or porcelain lined autoclaves may be used, and the copper autoclaves appear to be particularly effective, possibly by reason of a formation of the copper salt of the phthalic acid which is then decomposed. The copper evidently acts as a catalyst and may be added in the form of a finely divided metal or in the form of other copper compounds.

Even better results are obtained by heating the neutral and especially acid salts of substituted phthalic acids at temperatures from 150–400° C. thus, for example, acid sodium or other alkali metal phthalates may be used, as can acid calcium phthalates. Excellent results are also obtained by heating other salts of substituted phthalic acids, for example neutral sodium phthalates, copper phthalates, zinc phthalates and phthalates of other similar metals such as cadmium, aluminum and the like. In fact the present invention is not limited to any particular substituted phthalate. The temperatures which may be used will vary with the particular substance but in general range from 150 to 400° C., higher temperatures being used with substituted phthalic acids and with such substituted phthalates as those of zinc and copper, whereas somewhat lower temperatures ranging from 250 to 300° C. are effective with acid alkali metal substituted phthalates.

The final product, which contains both the substituted benzoic acid together with certain amounts of unchanged substituted phthalic acid or phthalates, may be readily separated by any of the ordinary means, for example by the different solubilities of salts or the free acids or the differences in the boiling points of their esters.

The invention will be described in connection with the following specific examples which are illustrative of typical embodiments of the invention but the latter is not limited to the details therein set forth.

Example 1

200 parts of a mixture of 3 and 4 nitrophthalic acids are run into an autoclave and about an equal amount of water is added, the autoclave being lined with copper. The mixture is heated up to about 350° C. and maintained at this temperature for about three hours. Good yields of the corresponding nitrobenzoic acids are obtained.

Example 2

200 parts of monochlorphthalic acid with about 180 parts of water are heated in a copper lined autoclave at about 350° C. Good yields of the corresponding benzoic acid are obtained.

Example 3

300 parts of zinc mononitrophthalate are placed in an autoclave with about an equal amount of water and heated to 300–400° C. Good yields of nitrobenzoic acid are obtained.

Example 4

300 parts of monochlorphthalic acid are treated with sufficient 8–9% sodium hydroxide or 10–15% sodium carbonate to produce the monosodium chlorphthalate. The mixture is heated in an autoclave to 250–275° C. for about twenty hours. Excellent yields of chlorbenzoic acid are obtained.

Instead of heating the monosodium salt, a mixture of equal parts of a monosodium salt and a free phthalic acid may be heated for about the same time under the same conditions, resulting in a good output of chlorbenzoic acid.

*Example 5*

300 parts of mono- or dichlorphthalic acid or chlornitrophthalic acid are treated as in Example 4, and good yields of the corresponding benzoic acids are obtained.

In the foregoing examples the heating takes place in an ordinary aqueous solution. Somewhat better results can be obtained, especially with nitrophthalic acids or their salts especially zinc and copper salts, if they are treated as described in the foregoing examples and hydrogen under pressure is introduced into the autoclave. The products are for the most part the corresponding aminobenzoic acids. Since aminobenzoic acids are usually more valuable than the nitrobenzoic acids, this modification is of importance as a direct production of aminobenzoic acids without separation of the nitrobenzoic acids may be readily obtained. If desired, finely divided catalysts such as copper, nickel, iron, cobalt, or zinc may be present in the mixture.

Certain mixed reactions may also be carried out. Thus, for example, if chlorphthalic acid or chlorphthalates are heated in the presence of ammonia, the chlorbenzoic acid formed will be transformed into diphenylamine dicarboxylic acid. Similarly, a mixture of chlorphthalic and aminophthalic acids may be split with similar results as is the case when chlorphthalic and nitrophthalic acids are split together in the presence of hydrogen. Other combined reactions are also possible and are included in the invention.

What is claimed as new is:

1. A method of preparing aminobenzoic acids from a member of the group consisting of nitrophthalic acid and its normal and acid salts, which comprises subjecting the nitrophthalic acid substances to heating in the presence of liquid water, hydrogen, and reducing catalysts at temperatures between 150 and 400° C.

2. A method of preparing aminobenzoic acids from a member of the group consisting of nitrophthalic acid and its normal and acid salts, which comprises subjecting the nitrophthalic acid substances to heating in the presence of liquid water and hydrogen at temperatures between 150 and 400° C.

ALPHONS O. JAEGER.